United States Patent
Mori et al.

(10) Patent No.: US 7,033,706 B2
(45) Date of Patent: Apr. 25, 2006

(54) RESIN COMPOSITIONS FOR POLYMER SOLID ELECTROLYTES AS WELL AS POLYMER SOLID ELECTROLYTES AND POLYMER BATTERIES USING THEM

(75) Inventors: Satoshi Mori, Kita-ku (JP); Minoru Yokoshima, Toride (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 159 days.

(21) Appl. No.: 10/432,419

(22) PCT Filed: Nov. 29, 2001

(86) PCT No.: PCT/JP01/10439

§ 371 (c)(1),
(2), (4) Date: Jul. 18, 2003

(87) PCT Pub. No.: WO02/45099

PCT Pub. Date: Jun. 6, 2002

(65) Prior Publication Data

US 2004/0076886 A1    Apr. 22, 2004

(30) Foreign Application Priority Data

| Nov. 30, 2000 | (JP) | ............ | 2000-364083 |
| Feb. 16, 2001 | (JP) | ............ | 2001-039298 |
| Aug. 10, 2001 | (JP) | ............ | 2001-243125 |
| Aug. 27, 2001 | (JP) | ............ | 2001-255437 |

(51) Int. Cl.
    *H01M 10/40*    (2006.01)
(52) U.S. Cl. .............. 429/317; 429/306; 429/307; 526/89; 526/227; 526/232.1
(58) Field of Classification Search ........ 526/89, 526/227, 232.1; 429/306, 307, 317
See application file for complete search history.

(56) References Cited

U.S. PATENT DOCUMENTS 5,622,791 A    4/1997  Shackle et al.
6,399,254 B1 *  6/2002  Kono et al. ............ 429/304

FOREIGN PATENT DOCUMENTS

| EP | 0 492 858 | 7/1992 |
| EP | 0 880 189 | 11/1998 |
| EP | 0 923 147 | 6/1999 |
| JP | 03-210351 | 9/1991 |
| JP | 3-210351 | 9/1991 |
| JP | 03210351 A * | 9/1991 |
| JP | 05-028824 | 2/1993 |
| JP | 05-182512 | 7/1993 |
| JP | 05-315007 | 11/1993 |
| JP | 07-072624 | 3/1995 |
| JP | 10-321040 | 12/1998 |
| JP | 2000-80138 | 3/2000 |
| JP | 2000-080138 | 3/2000 |
| JP | 2000080138 A * | 3/2000 |

OTHER PUBLICATIONS

Copy of the International Search report dated Mar. 12, 2002.
Copy of the European Communication dated Mar. 31, 2005.
Chinese Communication dated Dec. 10, 2004 with English Translation.
Copy of the European Search Report dated Feb. 7, 2005.

* cited by examiner

Primary Examiner—David W. Wu
Assistant Examiner—Satya B. Sastri
(74) Attorney, Agent, or Firm—Nields & Lemack

(57) ABSTRACT

Polymer solid electrolytes with good film strength, high ionic conductivity and excellent processability are provided, comprising a resin composition for polymer solid electrolytes containing 0.5–5.0% by weight of a curable resin having a specific structure (A), a plasticizer and (B) an electrolyte (C).

11 Claims, No Drawings

RESIN COMPOSITIONS FOR POLYMER SOLID ELECTROLYTES AS WELL AS POLYMER SOLID ELECTROLYTES AND POLYMER BATTERIES USING THEM

TECHNICAL FIELD

The present invention relates to resin compositions for polymer solid electrolytes comprising 0.5–5.0% by weight of a curable resin (A), a plasticizer (B) and an electrolyte (C), as well as polymer solid electrolytes and polymer batteries using them.

BACKGROUND ART

Conventional electrolytes used in electrochemical devices such as batteries, capacitors and sensors are in the form of solutions or pastes to ensure ionic conductivity, but they are associated with problems such as potential damage to the devices by leakage and the necessity of a separator for immersing the electrolytes, which limits downsizing to smaller and thinner devices. In contrast, products using solid electrolytes are free from such problems and can be easily made thinner. Moreover, solid electrolytes are excellent in heat resistance and advantageous for preparation processes of batteries or the like.

Especially, batteries using polymer-based solid electrolytes have the advantage that they are more flexible than those based on inorganic materials so that they can be processed into various shapes. However, polymer solid electrodes so far proposed still have a problem of the small output current due to the low ionic conductivity. For example, proposed methods involve incorporating a specific alkali metal salt into a mixture of an epichlorohydrin-based rubber and a low molecular weight polyethylene glycol derivative to provide a polymer solid electrode (JPA HEI 2-235957) or crosslinking polyethylene glycol diacrylate by polymerization reaction (JPA SHO 62-285954), but these electrolytes are insufficient in film strength and need a support so that further improvements would be desired in the balance of film strength, ionic conductivity, adhesion to electrodes, etc.

Recently, electric double layer capacitors comprising an ionically conductive solution inserted between polarizable electrodes made from carbon materials having a large specific surface area such as activated carbon or carbon black are often used in memory backup power sources or the like. For example, JPA SHO 63-244570 discloses a capacitor using $Rb_2Cu_3I_3Cl_7$ with high electric conductivity as an inorganic-based solid electrolyte. "Functional Materials" February, 1989, page 33 describes a capacitor using carbon-based polarizable electrodes and an organic electrolyte. However, electric double layer capacitors using current electrolyte solutions have problems with long-term use and reliability because they are liable to leakage to the outside of the capacitors or other troubles during long-term use or abnormalities such as exposure to high voltage. Another problem of conventional inorganic-based ionically conductive materials lies in the low output voltage because of the low electrolytic voltage.

Polymer solid electrolyte layers in batteries and capacitors serve for only ion migration, so that the batteries and capacitors can be provided with smaller overall volume and higher energy density as the electrolyte layers become thinner. Batteries and capacitors using thin polymer solid electrode layers can be provided with lower electric resistance and higher output current and charging current, thereby improving the power density of the batteries. Moreover, the cycle life can be improved because corrosion by ions, especially alkali metal ions are less liable to occur. Thus, there have been demands for polymer solid electrolytes having a high ionic conductivity and a film strength as good as possible so that they can be formed into thin films. In addition, they should have a sufficient ion conductivity at low temperatures, taking into account uses in low-temperature environments such as $-10°$ C. or less.

DISCLOSURE OF THE INVENTION

The present invention aims to provide a resin composition for polymer solid electrolytes having a strength enough to eliminate the necessity of a support even if it is formed into a thin film of about several tens of μm and also having a high ionic conductivity at room temperature and low temperatures and excellent processability.

As a result of careful studies to solve the problems described above, we found that our object can be achieved by using a composition comprising 0.5–5.0% by weight of a curable resin having a specific structure (A), a plasticizer and (B) an electrolyte (C). We further found that the problems described above such as ion conductivity at room temperature and low temperatures, film strength and processability are improved by using a polymer solid electrolyte obtained by curing said composition in a battery, and finally accomplished the present invention.

Accordingly, the present invention relates to:

(1) a resin composition for polymer solid electrolytes comprising 0.5–5.0% by weight of a curable resin(A), a plasticizer (B) and an electrolyte (C);

(2) a resin composition for polymer solid electrolytes comprising 0.5–3.0% by weight of a curable resin (A), a plasticizer (B) and an electrolyte (C);

(3) the resin composition for polymer solid electrolytes as defined in (1) or (2) above wherein the curable resin (A) is a curable monomer (A-1) having four or more reactive functional groups in one molecule and a reactive functional group equivalent weight of 150 or less;

(4) the resin composition for polymer solid electrolytes as defined in (1) or (2) above wherein the curable resin (A) is a curable monomer (A-1) having four or more reactive functional groups in one molecule and a reactive functional group equivalent weight of 100 or less;

(5) the resin composition for polymer solid electrolytes as defined in (3) or (4) above wherein the reactive functional groups in the curable monomer (A-1) are (meth)acrylate groups;

(6) the resin composition for polymer solid electrolytes as defined in any one of (3) to (5) above wherein the curable monomer (A-1) is a (meth)acrylate obtained by reacting 1 mol of a polyhydric alcohol with 1–5 mol of caprolactone;

(7) the resin composition for polymer solid electrolytes as defined in any one of (3) to (6) above wherein the curable monomer (A-1) is one or more members selected from the group consisting of caprolactone-modified tetra(meth)acrylates of pentaerythritol, caprolactone-modified tetra(meth)acrylates of ditrimethylolpropane, caprolactone-modified penta(meth)acrylates of dipentaerythritol and caprolactone-modified hexa(meth)acrylates of dipentaerythritol;

(8) the resin composition for polymer solid electrolytes as defined in (1) or (2) above wherein the curable resin (A) is a curable polymer (A-2) having an ether bond in the backbone and an ethylenically unsaturated double bond in the side chain wherein the ethylenically unsaturated double bond has an equivalent weight of 300 or less;

(9) the resin composition for polymer solid electrolytes as defined in (8) above wherein the curable polymer (A-2) is a polymer obtained by reacting a compound (A-2-1) having one or more hydroxyl groups in one molecule and a compound (A-2-2) having one ethylenically unsaturated double bond and one epoxy group in one molecule via the hydroxyl groups and epoxy groups;

(10) the resin composition for polymer solid electrolytes as defined in (1) or (2) above wherein the curable resin (A) is a curable polymer (A-3) having an aliphatic chain containing 6 or less carbon atoms and an ethylenically unsaturated double bond in the side chain wherein the ethylenically unsaturated double bond has an equivalent weight of 850 or less;

(11) the resin composition for polymer solid electrolytes as defined in any one of (1) to (10) above further containing a photoinitiator (D);

(12) the resin composition for polymer solid electrolytes as defined in (11) above wherein the photoinitiator (D) has a maximum molar extinction coefficient of 50 or more at a wavelength of 350–450 nm;

(13) the resin composition for polymer solid electrolytes as defined in any one of (1) to (10) above further containing a thermal polymerization initiator (E);

(14) the resin composition for polymer solid electrolytes as defined in (13) above wherein the thermal polymerization initiator (E) has a half-life of 10 hours at a temperature of 10° C. or more;

(15) the resin composition for polymer solid electrolytes as defined in any one of (1) to (14) above wherein the electrolyte (C) is at least one member selected from the group consisting of alkali metal salts, quaternary ammonium salts, quaternary phosphonium salts or transition metal salts;

(16) a polymer solid electrolyte comprising a cured product of the resin composition for polymer solid electrolytes as defined in any one of (1) to (15) above;

(17) the polymer solid electrolyte as defined in (16) above in the form of a sheet; and

(18) a polymer battery comprising the polymer solid electrolyte as defined in (16) or (17) above.

THE MOST PREFERRED EMBODIMENTS OF THE INVENTION

Resin compositions for polymer solid electrolytes of the present invention comprise 0.5–5.0% by weight of a curable resin having a specific structure (A), a plasticizer (B) and an electrolyte (C), wherein the curable resin (A) is preferably a curable monomer (A-1) or a curable polymer (A-2) or (A-3).

In resin compositions for polymer solid electrolytes used in the present invention, a curable resin (A) having known reactive functional groups can be used, where said reactive functional groups include (meth)acrylate, vinyl, epoxy, hydroxyl, carboxyl and isocyanate groups, especially (meth)acrylate. The curable resin (A) is preferably used in a ratio of 0.5–5.0% by weight, especially 0.5–3.0% by weight to the total resin composition. If the amount is 5.0% by weight or more, film strength is good but ion conductivity at room temperature and low temperatures decreases. If it is 0.5% by weight or less, however, sufficient film strength cannot be obtained.

When a curable monomer (A-1) is used as the curable resin in the present invention, the curable monomer (A-1) preferably has four or more reactive functional groups in one molecule and a reactive functional group equivalent weight of 150 or less in order to provide sufficient film strength even at a resin concentration of 5.0% by weight or less, such as ditrimethylolpropane tetra(meth)acrylate, ethylene oxide-modified pentaerythritol tetra(meth)acrylate, propylene oxide-modified pentaerythritol tetra(meth)acrylate, etc. More preferably, the curable monomer (A-1) has a reactive functional group equivalent weight of 100 or less, such as pentaerythritol tetraacrylate, dipentaerythritol pentaacrylate, dipentaerythritol hexaacrylate, etc.

The curable monomer (A-1) used in the present invention is preferably a (meth)acrylate obtained by reacting 1 mol of a polyhydric alcohol with 1–5 mol of caprolactone. The polyhydric alcohol is preferably a tetrafunctional or higher polyhydric alcohol, such as pentaerythritol, ditrimethylolpropane, dipentaerythritol, etc. The reaction product of the polyhydric alcohol and caprolactone can be obtained by reacting 1 mol of a polyhydric alcohol with 1–5 mol of caprolactone as described in JPB HEI 1-58176 (Japanese Patent No. 1571324), for example. Specific examples include caprolactone-modified tetra(meth)acrylates of pentaerythritol, caprolactone-modified tetra(meth)acrylates of ditrimethylolpropane and caprolactone-modified dipentaerythritol penta or hexa(meth)acrylates. The caprolactone used as a starting material is, e.g. γ-, δ- or ε-caprolactone, preferably ε-caprolactone.

The curable resin (A) may also be preferably a polymer (A-2) having an ether bond in the backbone and an ethylenically unsaturated double bond in the side chain wherein the ethylenically unsaturated bond has an equivalent weight of 300 or less. The curable polymer (A-2) preferably has a molecular weight of 500–1,000,000, more preferably 1,000–500,000.

The curable polymer (A-2) used in the present invention is preferably a polymer obtained by reacting a compound (A-2-1) having one or more hydroxyl groups in one molecule and a compound (A-2-2) having one ethylenically unsaturated double bond and one epoxy group in one molecule via the hydroxyl groups and epoxy groups.

The compound (A-2-1) having one or more hydroxyl groups in one molecule used in the present invention includes monofunctional alcohols such as methanol, ethanol, propanol, butanol, hexanol, methoxyethylene glycol, methoxypolyethylene glycol and methoxypolypropylene glycol; difunctional alcohols such as ethylene glycol, diethylene glycol, polyethylene glycol, propylene glycol, dipropylene glycol, polypropylene glycol, neopentyl glycol, 1,6-hexanediol, bisphenol A and ethoxy bisphenol A; polyfunctional alcohols such as trimethylolpropane, ethoxylated trimethylolpropane, propoxylated triethylene glycol, glycerin, ethoxylated glycerin, propoxylated glycerin, pentaerythritol, ethoxylated pentaerythritol, propoxylated pentaerythritol, dipentaerythritol, ethoxylated dipentaerythritol and propoxylated dipentaerythritol; and phenols such as phenol novolak and cresol novolak.

The compound (A-2-2) having one ethylenically unsaturated double bond and one epoxy group in one molecule used in the present invention includes glycidyl (meth)acrylate, (meth)acryloyl methylcyclohexene oxide and vinylcyclohexene oxide, for example.

The compound (A-2-1) having one or more hydroxyl groups in one molecule is preferably reacted with the compound (A-2-2) having one ethylenically unsaturated double bond and one epoxy group in one molecule in a molar ratio of 1:1–100,000, especially 1:10–50,000. The molecular weight of the curable polymer (A-2) can be controlled by the ratio between the compound (A-2-1) and the compound (A-2-2).

During the reaction, catalysts can be used. The catalysts include organic bases such as amines (e.g. methylamine, ethylamine, propylamine and piperazine), pyridines and imidazoles; organic acids such as formic acid, acetic acid and propionic acid; inorganic acids such as sulfuric acid and hydrochloric acid; alkyl metal alcoholates such as sodium methylate; alkalis such as KOH and NaOH; Lewis acids such as $BF_3$, $ZnCl_2$, $AlCl_3$ and $SnCl_4$ or complexes thereof; and organic metal compounds such as triethyl aluminium and zinc diethyl. These catalysts are preferably used at 0.01%–10%, especially 0.1%–5% on the basis of the reactants.

The reaction temperature depends on the activity of the catalysts used, but preferably ranges from −50° C. to 200° C., especially −30° C. to 100° C. The reaction period is preferably 30 minutes to 48 hours, especially 1 to 24 hours. During the reaction, polymerization inhibitors such as hydroquinone, methylhydroquinone, methoxyphenol and phenothiazine can be added.

During the reaction, solvents can be used. The solvents are not specifically limited so far as they have no active hydrogen, and include ketones such as acetone, methyl ethyl ketone and methyl isobutyl ketone; aromatics such as benzene, toluene and xylene; and ethers, aliphatic hydrocarbons and esters.

The curable resin (A) may also be preferably a curable polymer (A-3) having an aliphatic chain containing 6 or less carbon atoms and an ethylenically unsaturated double bond in the side chain wherein the ethylenically unsaturated double bond has an equivalent weight of 850 or less. The curable polymer (A-3) is obtained by first preparing a copolymer of a compound having an aliphatic chain containing 6 or less carbon atoms and an ethylenically unsaturated double bond and the above compound (A-2-2) and then reacting it with a compound having one unsaturated double bond and one carboxyl group each in one molecule. The curable polymer (A-3) preferably has a molecular weight of about 1,000–1,000,000, more preferably 2,000–500,000.

The copolymer of a compound having an aliphatic chain containing 6 or less carbon atoms and an ethylenically unsaturated double bond and the above compound (A-2-2) is obtained by copolymerizing a compound having an aliphatic chain containing 6 or less carbon atoms and an ethylenically unsaturated double bond such as methyl (meth)acrylate, ethyl (meth)acrylate, propyl (meth)acrylate, i-propyl (meth)acrylate, butyl (meth)acrylate, i-butyl (meth)acrylate, t-butyl (meth)acrylate and hexyl (meth)acrylate with the above compound (A-2-2). One or more of these compounds may be copolymerized or one or more ethylenically unsaturated monomers such as 2-hydroxyethyl acrylate, 2-hydroxypropyl (meth)acrylate, (meth)acrylic acid, styrene, phenoxyethyl (meth)acrylate, benzyl (meth)acrylate and α-methyl styrene may be copolymerized. The above compound (A-2-2) is preferably used at 0.1–90% by weight, especially 1–50% by weight on the basis of the total amount of the unsaturated monomers used for preparing the copolymer (A-3).

These polymers are obtained by known polymerization techniques such as solution polymerization or emulsion polymerization. Taking solution polymerization as an example, an ethylenically unsaturated monomer mixture is stirred with a polymerization initiator in a suitable organic solvent with heating at preferably 50–100° C. under a nitrogen stream. Suitable organic solvents include alcohols such as ethanol, propanol, isopropanol, butanol, isobutanol, 2-butanol, hexanol and ethylene glycol; ketones such as methyl ethyl ketone and cyclohexanone; aromatic hydrocarbons such as toluene and xylene; cellosolves such as Cellosolve and butyl cellosolve; carbitols such as Carbitol and butyl carbitol; propylene glycol alkyl ethers such as propylene glycol methyl ether; polypropylene glycol alkyl ethers such as dipropylene glycol methyl ether; acetic acid esters such as ethyl acetate, butyl acetate, cellosolve acetate and propylene glycol monomethyl acetate; lactic acid esters such as ethyl lactate and butyl lactate; dialkyl glycol ethers; and carbonates such as ethylene carbonate and propylene carbonate; These organic solvents can be used alone or in combination.

Preferably, the polymerization initiator can be a peroxide such as benzoyl peroxide or an azo compound such as azobisisobutyronitrile, and the reaction temperature is 40–150° C. and the reaction period is 1–50 hours.

Then, the copolymer is reacted with a compound having one unsaturated double bond and one carboxyl group each in one molecule (e.g. (meth)acrylic acid). Preferably, the compound having one unsaturated double bond and one carboxyl group each in one molecule is reacted in a ratio of 0.8–1.1 equivalents to 1 equivalent of the epoxy group of the copolymer. In order to promote the reaction, 0.1–1% of a basic compound such as triphenylphosphine, triphenylstibine, triethylamine, triethanolamine, tetramethylammonium chloride or benzyltriethylammonium chloride is added into the reaction solution as a reaction catalyst. In order to prevent polymerization during the reaction, 0.05–0.5% of a polymerization inhibitor (e.g. methoxyphenol, methylhydroquinone, hydroquinone, phenothiazine) is preferably added into the reaction solution. The reaction temperature is normally 90–150° C., and the reaction period is 5–40 hours.

In the present invention, a plasticizer (B) is used. A low molecular weight compound is preferably added into compositions of the present invention as the plasticizer (B) because it further improves the ionic conductivity of polymer solid electrolytes obtained after curing. The plasticizer (B) is preferably added in a ratio of 1,600–19,900 parts by weight, especially 2,800–19,900 parts by weight to 100 parts by weight of component (A). The ionic conductivity of the polymer solid electrolytes increases with this amount, but the mechanical strength of the polymer solid electrolytes decreases if it is too excessive.

Suitable compounds as the plasticizer (B) have good compatibility for component (A), a high dielectric constant, a boiling point of 70° C. or more and a wide electrochemically stable range. Such plasticizers (B) include oligoethers such as triethylene glycol methyl ether and tetraethylene glycol dimethyl ether; carbonates such as ethylene carbonate, propylene carbonate, dimethyl carbonate, diethyl carbonate, vinylene carbonate and (meth)acryloyl carbonate; aromatic nitriles such as benzonitrile and tolunitrile; and dimethyl formamide, dimethyl sulfoxide, N-methyl pyrrolidone, sulfolane and phosphoric acid esters. Among them, oligoethers and carbonates are preferred, especially carbonates.

In the present invention, an electrolyte (C) is used. The proportion of the electrolyte in compositions of the present invention is preferably 0.1–50% by weight, especially 1–30% by weight. The ion migration is significantly inhibited if the electrolyte (C) is excessive while the absolute amount of ions is insufficient and the ion conductivity decreases if it is too little.

The electrolyte (C) used in the present invention is not specifically limited, but may be any electrolyte containing ions desired to be electric charge carriers and desirably having a large dissociation constant in polymer solid electrolytes obtained after curing. Recommended examples are alkali metal salts, quaternary ammonium salts such as $(CH_3)$ $_4NBF_6$, quaternary phosphonium salts such as $(CH_3)_4PBF_6$, transition metal salts such as $AgClO_4$, or protonic acids such as hydrochloric acid, perchloric acid and fluoroboric acid, among which alkali metals, quaternary ammonium salts, quaternary phosphonium salts or transition metal salts are preferred.

Those alkali metal salts include e.g. $LiCF_3SO_3$, $LiPF_6$, $LiClO_4$, LiL, $LiBF_4$, LiSCN, $LiAsF_6$, $NaCF_3SO_3$, $NaPF_6$, $NaClO_4$, NaI, $NaBF_4$, $NaAsF_6$, $KCF_3SO_3$, $KPF_6$ and KI.

In the present invention, a photoinitiator (D) can be used. The photoinitiator (D) may be any known photoinitiator preferably having a maximum molar extinction coefficient of 50 or more at a wavelength of 350–450 nm. Resin compositions of the present invention are made UV-curable by using this photoinitiator (D). The photoinitiator (D) is preferably used in a ratio of 0.5–70 parts by weight, especially 1–30 parts by weight to 100 parts by weight of component (A).

Siuitable photoinitiators (D) include e.g. 2-benzyl-2-dimethylamino-1-(4-morpholinophenyl)butanone-1 (Irgacure 369 from Ciba Specialty Chemicals), 2,4-diethylthioxanthone, 2-isopropylthioxanthone, Michler's ketone, 4,4'-bis(diethylamino)benzophenone, bisacylphosphine oxides, etc. Especially preferred are phosphorous compounds such as bisacylphosphine oxides. Examples of bisacylphosphine oxides include bis(2,4,6-trimethylbenzoyl)-phenylphosphine oxide, bis(2,6-dimethoxybenzoyl)-2,4,4-trimethylpentylphosphine oxide, etc.

These photoinitiators (D) can be combined with other photoinitiators such as 1-hydroxy-2-cyclohexyl phenyl ketone, 2-hydroxy-2-methyl propiophenone, methylphenyl glyoxylate and 2,2-diethoxyacetophenone.

In the present invention a thermal polymerization initiator (E) can be used. The thermal polymerization initiator (E) can be any known thermal polymerization initiator preferably having a half-life of 10 hours at a temperature of 10° C. or more. Resin compositions of the present invention are made thermosetting by using this thermal polymerization initiator (E). The thermal polymerization initiator (E) is preferably used in a ratio of 0.5–70 parts by weight, especially 0.1–30 parts by weight to 100 parts by weight of component (A).

Specific examples of the thermal polymerization initiator (E) include:

organic peroxides, e.g. ketone peroxides such as methyl ethyl ketone peroxide, methyl isobutyl ketone peroxide, methylcyclohexanone peroxide and cyclohexanone peroxide; hydroperoxides such as 2,4,4-trimethylpentyl hydroperoxide, diisopropylbenzene hydroperoxide, cumene hydroperoxide and t-butyl hydroperoxide; diacyl peroxides such as isobutyryl peroxide, 2,4-dichlorobenzoyl peroxide, o-chlorobenzoyl peroxide, bis-3,5,5-trimethylhexanoyl peroxide, lauroyl peroxide, benzoyl peroxide and p-chlorobenzoyl peroxide; dialkyl peroxides such as dicumyl peroxide, 2,5-dimethyl-2,5-di-(t-butylperoxy)hexane, 1,3-bis(t-butylperoxyisopropyl)benzene, di-t-butyl peroxide, 2,5-dimethyl-2,5-di-(t-butylperoxy)hexyne-3 and tris-(t-butylperoxy)triazine; peroxyketals such as 1,1-di-t-butylperoxy-3,3, 5-trimethylcyclohexane, 1,1-di-(t-butylperoxy)cyclohexane, 2,2-di-(t-butylperoxy)butane, 4,4-di-(t-butylperoxy)valeric acid-n-butyl ester and 2,2-bis(4,4-di-t-butylperoxy-cyclohexyl)propane; alkyl peresters such as 2,4,4-trimethylpentyl peroxyneodecanoate, α-cumyl peroxyneodecanoate, t-butyl peroxynonadecanoate and t-butyl peroxypivalate; alkyl peresters such as 2,2,4-trimethylpentyl peroxy-2-ethylhexanoate, t-amyl peroxy-2-ethylhexanoate, t-butyl peroxy-2-ethylhexanoate, t-butyl peroxyisobutyrate, di-t-butyl peroxyhexahydroterephthalate, t-butyl peroxy-3,3,5-trimethylhexanoate, t-butyl peroxyacetate, t-butyl peroxybenzoate and di-t-butyl peroxytrimethyladipate; and percarbonates such as di-3-methoxy peroxydicarbonate, di-2-ethylhexyl peroxydicarbonate, bis(4-t-butylcyclohexyl) peroxydicarbonate, diisopropyl peroxydicarbonate, t-butyl peroxyisopropylcarbonate, 1,6-bis(t-butylperoxycarbonyloxy) hexane and diethylene glycol-bis(t-butyl peroxycarbonate); and azo compounds such as 1,1'-azobis(cyclohexane-1-carbonitrile), 2,2'-azobis(2-methyl-butyronitrile), 2,2'-azobisisobutyronitrile, 2,2'-azobis{2-methyl-N-[1,1-bis(hydroxymethyl)-2-hydroxyethyl]propionamide}, 2,2'-azobis[2-methyl-N-(2-hydroxyethyl) propionamide], 2,2'-azobis(2-methylpropionamide) dehydrate, azodi-t-octane and 2-cyano-2-propylazoformamide, which may be used alone or in combination of two or more.

In the present invention, reactive monomers (F) and reactive oligomers (G) and the like other than the curable resin (A) may be combined. Preferably, these reactive monomer (F) and reactive oligomer (G) are used each in a ratio of 0–100 parts by weight to 100 parts by weight of component (A).

Reactive monomers (F) include e.g. carbitol (meth)acrylate, polyethylene glycol di(meth)acrylate, neopentyl glycol hydroxypivalate di(meth)acrylate, trimethylolpropane tri (meth)acrylate, trimethylolpropane polyoxyethyl tri(meth) acrylate, etc.

Reactive oligomers (G) include e.g. polyester poly(meth) acrylates, urethane (meth)acrylates, epoxy (meth)acrylates, etc.

Polyester poly(meth)acrylates include e.g. reaction products of a polyester polyol consisting of a polyhydric alcohol and a polybasic acid or an anhydrate thereof with (meth) acrylic acid. Polyhydric alcohols include e.g. ethylene glycol, neopentyl glycol, polyethylene glycol, trimethylolpropane, etc. and polybasic acids include e.g. succinic acid, adipic acid, phthalic acid, tetrahydrophthalic acid, hexahydrophthalic acid, trimellitic acid, etc.

Urethane (meth)acrylates include e.g. reaction products of a polyol and an organic isocyanate and a monohydroxyl-containing (meth) acrylate. Polyols include e.g. polyethylene glycol, polypropylene glycol, polyester polyol, polycaprolactone polyol, polycarbonate polyol, polytetramethylene glycol, etc., and organic isocyanates include e.g. tolylene diisocyanate, isophorone diisocyanate, hexamethylene diisocyanate, diphenylmethane diisocyanate, hydrogenated diphenylmethane diisocyanate, etc. Monohydroxyl-containing (meth)acrylates include e.g. 2-hydroxyethyl (meth)acrylate, 2-hydroxypropyl (meth) acrylate, polyethylene glycol mono(meth)acrylate, pentaerythritol tri(meth)acrylate, etc.

Epoxy (meth)acrylates include e.g. reaction products of an aliphatic polyglycidyl ether and (meth)acrylic acid. Aliphatic polyglycidyl ethers include e.g. glycerin diglycidyl ether, polyethylene glycol diglycidyl ether, polypropylene glycol diglycidyl ether, etc.

Resin compositions for polymer solid electrolytes of the present invention can be obtained by homogeneously mixing the curable resin (A), plasticizer (B), electrolyte (C), photoinitiator (D) and/or thermal polymerization initiator (E) described above optionally with the reactive monomers (F) and reactive oligomers (G) described above as well as another polymer (H) and/or solvent (I). If the solvent (I) is used, it may be any solvent that does not inhibit polymerization, such as tetrahydrofuran, toluene, etc.

Resin compositions for polymer solid electrolytes having the various formulations as described above are characterized in that the curable resin (A) is contained in an amount of 0.5–5.0% by weight in the compositions.

In the present invention, the polymer (H) that can be optionally used includes polyethylene glycol, polyacrylonitrile, polybutadiene, poly(meth)acrylic acid esters, polystyrene, polyphosphazenes, polysiloxane or polysilane, etc. These polymers (H) are preferably used in a ratio of 0–100 parts by weight to 100 parts by weight of component (A).

Polymer solid electrolytes of the present invention comprise cured products of the resin compositions for polymer solid electrolytes described above. The cured products can be obtained by polymerizing the resin compositions for polymer solid electrolytes described above by irradiation with electromagnetic waves (energy rays) such as UV rays (e.g. UV rays at 1–100,000 mJ/cm$^2$) or heating at 20–200° C. to polymerize them. Especially, the resin compositions for polymer solid electrolytes described above are preferably formed into sheets (coatings, films) or the like and then polymerized by irradiation with electromagnetic waves such as electron rays or UV rays or heating to prepare sheet-like polymer products, which are highly advantageous for applications because of the wider freedom of processability. Sheet-like polymer solid electrolytes can be typically prepared by applying the resin compositions for polymer solid electrolytes described above on a support using various coaters or the like such as roll coaters, dip coaters and curtain coaters, and then curing the resin compositions by irradiation with electromagnetic waves such as UV rays or heating. The support may be an aluminum-deposited PET film, for example. In order to cure the surface more reliably, another support may be subsequently applied on the surface of the cured film of the resin compositions and further irradiated with electromagnetic waves such as UV rays or heated. Such another support may be a polypropylene film, for example. Thus obtained cured products are normally used after removing the support.

Polymer batteries of the present invention have a structure comprising such a polymer solid electrolyte sandwiched between an anode and a cathode, for example. The polymer batteries are preferably in the form of a sheet, so that the polymer solid electrolyte, anode and cathode are also preferably in the form of a sheet.

The anode can be an anode active material processed into a sheet combined with a binder resin used for bonding a collector such as an aluminum, copper or nickel foil or the like and the anode active material. Preferred anode active materials for obtaining high-voltage and high-capacity batteries are low-redox potential materials having alkali metal ions as carriers including alkali metals, alkali metal alloys such as lithium/aluminum alloys or lithium/lead alloys or lithium/antimony alloys and carbon materials and mixtures thereof. Carbon materials are especially preferred because they are charged with Li ions at a low redox potential and they are stable and safe. Carbon materials capable of charging and discharging Li ions include natural graphite, artificial graphite, graphite grown from gas-phase, petroleum coke, coke, pitch-based carbons, polyacenes, fullerenes such as $C_{60}$ and $C_{70}$.

The cathode can be a cathode active material processed into a sheet with a binder resin used for bonding a collector such as an aluminum, copper or nickel foil or the like and the cathode active material. Preferred cathode active materials for obtaining high-voltage and high-capacity batteries are high-redox potential materials such as metal oxides, metal sulfides, electrically conductive polymers or carbon materials or mixtures thereof. Especially, metal oxides such as cobalt oxide, manganese oxide, vanadium oxide, nickel oxide and molybdenum oxide and metal sulfides such as molybdenum sulfide, titanium sulfide and vanadium sulfide are preferably used to attain high packing density and therefore high volumetric energy density, while manganese oxide, nickel oxide, cobalt oxide and the like are preferred for high capacity and high voltage. These cathode active materials are preferably used with Li elements inserted into (complexed with) metal oxides or metal sulfides in the form of $LiCoO_2$ or $LiMnO_2$, for example. Cathodes can be prepared by inserting Li elements as descrobed above or by mixing a salt such as $Li_2CO_3$ and a metal oxide and heating the mixture as described in U.S. Pat. No. 4,357,215.

Electrically conductive polymers are also preferably used as cathode active materials because they are enough flexible to be easily formed into thin films. Electrically conductive polymers include e.g. polyaniline, polyacetylene and derivatives thereof, polypyrrole and derivatives thereof, polythienylene and derivatives thereof, polypyridinediyl and derivatives thereof, polyisothianaphthenylene and derivatives thereof, polyfurylene and derivatives thereof, polyselenophene and derivatives thereof, and poly(arylene vinylenes) such as polyparaphenylene vinylene, polythienylene vinylene, polyfurylene vinylene, polynaphthenylene vinylene, polyselenophene vinylene, polypyridinediyl vinylene and derivatives thereof. Especially preferred are polymers of aniline derivatives soluble in organic solvents.

In these batteries and electrodes, conductive polymers used as electrode active materials are prepared according to chemical or electrochemical processes or other known processes.

EXAMPLES

The present invention is further illustrated by way of representative examples below. These examples are given only for illustrative purposes, but are not construed to limit the invention thereto.

Synthesis Example 1

Synthesis Example of Curable Polymer (A-2)

In a round-bottomed flask equipped with a stirrer and a condenser tube, 100 g of ethylene glycol dimethyl ether as reaction medium, 15.0 g of triethylene glycol as (A-2-1), 0.1 g of methoxyphenol and 0.1 g of $BF_3$ etherate were added and heated to 50° C. Then, 85.2 g of glycidyl methacrylate as (A-2-2) was added dropwise with stirring over 2 hours and reacted for 10 hours. A curable polymer solution having a methacrylate equivalent weight of 167, a solids content of 50% and a weight average molecular weight of 2,000 (by GPC) was obtained.

Synthesis Example 2

Synthesis Example of Curable Polymer (A-2)

In a round-bottomed flask equipped with a stirrer and a condenser tube, 100 g of ethylene glycol dimethyl ether as reaction medium, 5.0 g of triethylene glycol as (A-2-1), 0.1 g of methoxyphenol and 0.1 g of $BF_3$ etherate were added and heated to 50° C. Then, 95.0 g of glycidyl methacrylate as (A-2-2) was added dropwise with stirring over 2 hours and reacted for 10 hours. A polymer solution having a methacrylate equivalent weight of 149, a solids content of 50% and a weight average molecular weight of 6,000 (by GPC) was obtained.

Synthesis Example 3

Synthesis Example of Curable Polymer (A-2)

In a round-bottomed flask equipped with a stirrer and a condenser tube, 100 g of ethylene glycol dimethyl ether as reaction medium, 6.7 g of trimethylolpropane as (A-2-1), 0.1 g of methoxyphenol and 0.1 g of $BF_3$ etherate were added and heated to 50° C. Then, 93.3 g of glycidyl methacrylate as (A-2-2) was added dropwise with stirring over 2 hours and reacted for 10 hours. A polymer solution having a methacrylate equivalent weight of 151, a solids content of 50% and a weight average molecular weight of 4,000 (by GPC) was obtained.

Synthesis Example 4

Synthesis Example of Curable Polymer (A-2)

In a round-bottomed flask equipped with a stirrer and a condenser tube, 100 g of ethylene glycol dimethyl ether as reaction medium, 3.4 g of trimethylolpropane as (A-2-1), 0.1 g of methoxyphenol and 0.1 g of $BF_3$ etherate were added and heated to 50° C. Then, 96.3 g of glycidyl methacrylate as (A-2-2) was added dropwise with stirring over 2 hours and reacted for 10 hours. A polymer solution having a methacrylate equivalent weight of 146, a solids content of 50% and a weight average molecular weight of 8,000 (by GPC) was obtained.

Synthesis Example 5

Synthesis Example of Curable Polymer (A-3)

In a round-bottomed flask equipped with a stirrer and a condenser tube, 105 g of i-butyl methacrylate, 45 g of glycidyl methacrylate, 150 g of propylene carbonate and 4.5 g of benzoyl peroxide were added and reacted at 75° C. for 5 hours under a nitrogen stream to give a polymer solution having a solids content of 50% and a weight average molecular weight of 20,000 (by GPC). To 300 g of this polymer solution were added 22.0 g of acrylic acid, 0.16 g of methylhydroquinone, 0.9 g of triphenylphosphine and 22.0 g of propylene carbonate and mixed in solution and reacted at 95° C. for 32 hours to give a polymer solution having an acrylate equivalent weight of 563, a solids content of 50% and a weight average molecular weight of 23,000 (by GPC).

Synthesis Example 6

Synthesis Example of Curable Polymer (A-3)

In a round-bottomed flask equipped with a stirrer and a condenser tube, 65 g of i-butyl acrylate, 40 g of methyl acrylate, 45 g of glycidyl methacrylate, 150 g of propylene carbonate and 4.5 g of benzoyl peroxide were added and reacted at 75° C. for 5 hours under a nitrogen stream to give a polymer solution having a solids content of 50% and a weight average molecular weight of 20,000 (by GPC). To 300 g of this polymer solution were added 22.0 g of acrylic acid, 0.16 g of methylhydroquinone, 0.9 g of triphenylphosphine and 22.0 g of propylene carbonate and mixed in solution and reacted at 95° C. for 32 hours to give a polymer solution having an acrylate equivalent weight of 563, a solids content of 50% and a weight average molecular weight of 23,000 (by GPC).

Synthesis Example 7

Synthesis Example of Curable Polymer (A-3)

In a round-bottomed flask equipped with a stirrer and a condenser tube, 120 g of ethyl acrylate, 30 g of glycidyl methacrylate, 150 g of propylene carbonate and 4.5 g of benzoyl peroxide were added and reacted at 75° C. for 5 hours under a nitrogen stream to give a polymer solution having a solids content of 50% and a weight average molecular weight of 20,000 (by GPC). To 300 g of this polymer solution were added 15.0 g of acrylic acid, 0.16 g of methylhydroquinone, 0.9 g of triphenylphosphine and 15.0 g of propylene carbonate and mixed in solution and reacted at 95° C. for 32 hours to give a polymer solution having an acrylate equivalent weight of 792, a solids content of 50% and a weight average molecular weight of 23,000 (by GPC).

Example 1

A mixed electrolyte solution was obtained by thoroughly mixing 0.3 g of caprolactone-modified dipentaerythritol hexaacrylate (modified with 2 mol $\epsilon$-caprolactone) (functionality 6, acrylate equivalent weight=134; KAYARAD DPCA-20 (manufactured by Nippon Kayaku Co., Ltd.)) as curable monomer (A-1), 4.85 g of ethylene carbonate and 4.85 g of diethyl carbonate as plasticizers (B), 1.0 g of $LiPF_6$ as electrolyte (C) and 0.03 g of benzoyl peroxide (thermal polymerization initiator) as thermal polymerization initiator (E) in an argon atmosphere. This mixed solution was applied in a thickness of 30 µm on the aluminum layer of an aluminum-deposited PET film (30 µm) using a coater in an argon atmosphere and then covered with a propylene film (30 µm) and the assembly was heated at 80° C. for 5 hours, after which the top and bottom films were separated to give a polymer solid electrolyte in the form of a transparent self-supporting film having a thickness of about 30 µm. This film was measured for ionic conductivity at 25° C. and −20° C. to show 3.0 ms/cm (25° C.) and 0.3 ms/cm (−20° C.).

Example 2

A mixed electrolyte solution was obtained by thoroughly mixing 0.4 g of ditrimethylolpropane tetraacrylate (functionality 4, acrylate equivalent weight=116; KAYARAD T-1420 (manufactured by Nippon Kayaku Co., Ltd.)) as (A-1), 4.8 g of ethylene carbonate and 4.8 g of diethyl carbonate as (B), 1.0 g of $LiBF_4$ as (C) and 0.05 g of bis(2,4,6-trimethylbenzoyl)-phenylphosphine oxide (radical photoinitiator) as photoinitiator (D) in an argon atmosphere. This mixed solution was applied in a thickness of 30 µm on the aluminum layer of an aluminum-deposited PET film (30 µm) using a coater in an argon atmosphere and then irradiated with a high voltage mercury lamp at 200 mJ/cm² to form a polymer solid electrolyte. Then, a propylene film (30 µm) was applied on this polymer solid electrolyte layer and further irradiated with a high-pressure mercury lamp at 300 mJ/cm², after which the top and bottom films were separated to give a polymer solid electrolyte in the form of a transparent self-supporting film having a thickness of about 30 µm. This film was measured for ionic conductivity at 25° C. and −20° C. to show 4.2 ms/cm (25° C.) and 0.4 ms/cm (−20° C.).

Example 3

A mixed electrolyte solution was obtained by thoroughly mixing 0.2 g of a mixture of dipentaerythritol hexaacrylate (functionality 6, acrylate equivalent weight=91) dipentaerythritol pentaacrylate (functionality 5, acrylate equivalent weight=105) (KAYARAD DPHA (manufactured by Nippon Kayaku Co., Ltd.)) as (A-1), 4.9 g of ethylene carbonate and 4.9 g of diethyl carbonate as (B), 1.0 g of $LiPF_6$ as (C) and 0.05 g of bis(2,4,6-trimethylbenzoyl)-phenylphosphine oxide (radical photoinitiator) as photoinitiator (D) in an argon atmosphere. This mixed solution was applied in a thickness of 30 μm on the aluminum layer of an aluminum-deposited PET film. (30 μm) using a coater in an argon atmosphere and then irradiated with a high-pressure mercury lamp at 200 $mJ/cm^2$ to form a polymer solid electrolyte. Then, a propylene film (30 μm) was applied on this polymer solid electrolyte layer and further irradiated with a high-pressure mercury lamp at 300 $mJ/cm^2$, after which the top and bottom films were separated to give a polymer solid electrolyte in the form of a transparent self-supporting film having a thickness of about 30 μm. This film was measured for ionic conductivity at 25° C. and −20° C. to show 3.8 ms/cm (25° C.) and 0.4 ms/cm (−20° C.).

Example 4

A mixed electrolyte solution was obtained by thoroughly mixing 1.0 g of the curable polymer solution obtained in Synthesis example 1 as curable polymer (A-2), 4.5 g of ethylene carbonate and 4.5 g of diethyl carbonate as (B), 1.0 g of $LiPF_6$ as (C) and 0.05 g of bis(2,4,6-trimethylbenzoyl)-phenylphosphine oxide (radical photoinitiator) as photoinitiator (D) in an argon atmosphere. This mixed solution was applied in a thickness of 30 μm on the aluminum layer of an aluminum-deposited PET film (30 μm) using a coater in an argon atmosphere and then irradiated with a high-pressure mercury lamp at 200 $mJ/cm^2$ to form a polymer solid electrolyte. Then, a propylene film (30 μm) was applied on this polymer solid electrolyte layer and further irradiated with a high-pressure mercury lamp at 300 $mJ/cm^2$, after which the top and bottom films were separated to give a polymer solid electrolyte in the form of a transparent self-supporting film having a thickness of about 30 μm. This film was measured for ionic conductivity at 25° C. and −20° C. to show 3.0 ms/cm (25° C.) and 0.3 ms/cm (−20° C.).

Example 5

A mixed electrolyte solution was obtained by thoroughly mixing 1.0 g of the polymer solution obtained in Synthesis example 2 as (A-2), 4.5 g of ethylene carbonate and 4.5 g of diethyl carbonate as (B), 1.0 g of $LiPF_6$ as (C) and 0.03 g of benzoyl peroxide (thermal polymerization initiator) as (E) in an argon atmosphere. This mixed solution was applied in a thickness of 30 μm on the aluminum layer of an aluminum-deposited PET film (30 μm) using a coater in an argon atmosphere and then covered with a propylene film (30 μm) and the assembly was heated at 80° C. for 5 hours, after which the top and bottom films were separated to give a polymer solid electrolyte in the form of a transparent self-supporting film having a thickness of about 30 μm. This film was measured for ionic conductivity at 25° C. and −20° C. to show 2.5 ms/cm (25° C.) and 0.3 ms/cm (−20° C.).

Example 6

A mixed electrolyte solution was obtained by thoroughly mixing 1.0 g of the polymer solution obtained in Synthesis example 3 as (A-2), 4.5 g of ethylene carbonate and 4.5 g of diethyl carbonate as (B), 1.0 g of $LiPF_6$ as (C) and 0.03 g of benzoyl peroxide (thermal polymerization initiator) as (E) in an argon atmosphere. This mixed solution was applied in a thickness of 30 μm on the aluminum layer of an aluminum-deposited PET film (30 μm) using a coater in an argon atmosphere and then covered with a propylene film (30 μm) and the assembly was heated at 80° C. for 5 hours, after which the top and bottom films were separated to give a polymer solid electrolyte in the form of a transparent self-supporting film having a thickness of about 30 μm. This film was measured for ionic conductivity at 25° C. and −20° C. to show 3.0 ms/cm (25° C.) and 0.3 ms/cm (−20° C.).

Example 7

A mixed electrolyte solution was obtained by thoroughly mixing 0.8 g of the polymer solution obtained in Synthesis example 4 as (A-2), 4.6 g of ethylene carbonate and 4.6 g of diethyl carbonate as (B), 1.0 g of $LiPF_6$ as (C) and 0.03 g of benzoyl peroxide (thermal polymerization initiator) as (E) in an argon atmosphere. This mixed solution was applied in a thickness of 30 μm on the aluminum layer of an aluminum-deposited PET film (30 μm) using a coater in an argon atmosphere and then covered with a propylene film (30 μm) and the assembly was heated at 80° C. for 5 hours, after which the top and bottom films were separated to give a polymer solid electrolyte in the form of a transparent self-supporting film having a thickness of about 30 μm. This film was measured for ionic conductivity at 25° C. and −20° C. to show 3.0 ms/cm (25° C.) and 0.3 ms/cm (−20° C.).

Example 8

A mixed electrolyte solution was obtained by thoroughly mixing 0.4 g of ditrimethylolpropane tetraacrylate (functionality 4, acrylate equivalent weight=116; KAYARAD T-1420 (manufactured by Nippon Kayaku Co., Ltd.)) as (A-1), 4.7 g of ethylene carbonate and 4.8 g of diethyl carbonate as (B), 1.0 g of $LiBF_4$ as (C), 0.05 g of bis(2,4,6-trimethylbenzoyl)-phenylphosphine oxide (radical photoinitiator) as photoinitiator (D) and 0.1 g of trimethylolpropane triacrylate as reactive monomer (F) in an argon atmosphere. This mixed solution was applied in a thickness of 30 μm on the aluminum layer of an aluminum-deposited PET film (30 μm) using a coater in an argon atmosphere and then irradiated with a high-pressure mercury lamp at 200 $mJ/cm^2$ to form a polymer solid electrolyte. Then, a propylene film (30 μm) was applied on this polymer solid electrolyte layer and further irradiated with a high-pressure mercury lamp at 300 $mJ/cm^2$, after which the top and bottom films were separated to give a polymer solid electrolyte in the form of a transparent self-supporting film having a thickness of about 30 μm. This film was measured for ionic conductivity at 25° C. and −20° C. to show 3.8 ms/cm (25° C.) and 0.4 ms/cm (−20° C.).

Example 9

A mixed electrolyte solution was obtained by thoroughly mixing 0.4 g of ditrimethylolpropane tetraacrylate (functionality 4, acrylate equivalent weight=116; KAYARAD T-1420 (manufactured by Nippon Kayaku Co., Ltd.)) as (A-1), 4.7 g of ethylene carbonate and 4.7 g of diethyl carbonate as (B), 1.0 g of LiBF$_4$ as (C), 0.05 g of bis(2,4,6-trimethylbenzoyl)-phenylphosphine oxide (radical photoinitiator) as photoinitiator (D) and 0.2 g of diacrylate of polyethylene glycol diglycidyl ether as reactive oligomers (G) in an argon atmosphere. This mixed solution was applied in a thickness of 30 μm on the aluminum layer of an aluminum-deposited PET film (30 μm) using a coater in an argon atmosphere and then irradiated with a high-pressure mercury lamp at 200 mJ/cm$^2$ to form a polymer solid electrolyte. Then, a propylene film (30 μm) was applied on this polymer solid electrolyte layer and further irradiated with a high-pressure mercury lamp at 300 mJ/cm$^2$, after which the top and bottom films were separated to give a polymer solid electrolyte in the form of a transparent self-supporting film having a thickness of about 30 μm. This film was measured for ionic conductivity at 25° C. and −20° C. to show 3.6 ms/cm (25° C.) and 0.3 ms/cm (−20° C.).

Example 10

A mixed electrolyte solution was obtained by thoroughly mixing 0.4 g of ditrimethylolpropane tetraacrylate (functionality 4, acrylate equivalent weight=116; KAYARAD T-1420 (manufactured by Nippon Kayaku Co., Ltd.)) as (A-1), 4.7 g of ethylene carbonate and 4.8 g of diethyl carbonate as (B), 1.0 g of LiBF$_4$ as (C), 0.05 g of bis(2,4,6-trimethylbenzoyl)-phenylphosphine oxide (radical photoinitiator) as photoinitiator (D) and 0.1 g of polyacrylonitrile as other polymer (H) in an argon atmosphere. This mixed solution was applied in a thickness of 30 μm on the aluminum layer of an aluminum-deposited PET film (30 μm) using a coater in an argon atmosphere and then irradiated with a high-pressure mercury lamp at 200 mJ/cm$^2$ to form a polymer solid electrolyte. Then, a propylene film (30 μm) was applied on this polymer solid electrolyte layer and further irradiated with a high-pressure mercury lamp at 300 mJ/cm$^2$, after which the top and bottom films were separated to give a polymer solid electrolyte in the form of a transparent self-supporting film having a thickness of about 30 μm. This film was measured for ionic conductivity at 25° C. and −20° C. to show 3.9 ms/cm (25° C.) and 0.4 ms/cm (−20° C.).

Example 11

A mixed electrolyte solution was obtained by thoroughly mixing 1.0 g of the curable polymer solution obtained in Synthesis example 1 as curable polymer (A-2), 3.9 g of ethylene carbonate and 4.0 g of diethyl carbonate as (B), 1.0 g of LiPF$_6$ as (C), 0.05 g of bis(2,4,6-trimethylbenzoyl)-phenylphosphine oxide (radical photoinitiator) as (D), 0.1 g of trimethylolpropane triacrylate as reactive monomer (F) and 1.0 g of tetrahydrofuran as solvent (I) in an argon atmosphere. This mixed solution was applied in a thickness of 30 μm on the aluminum layer of an aluminum-deposited PET film (30 μm) using a coater in an argon atmosphere and then irradiated with a high-pressure mercury lamp at 200 mJ/cm$^2$ to form a polymer solid electrolyte. Then, a propylene film (30 μm) was applied on this polymer solid electrolyte layer and further irradiated with a high-pressure mercury lamp at 300 mJ/cm$^2$, after which the top and bottom films were separated to give a polymer solid electrolyte in the form of a transparent self-supporting film having a thickness of about 30 μm. This film was measured for ionic conductivity at 25° C. and −20° C. to show 3.0 ms/cm (25° C.) and 0.3 ms/cm (−20° C.).

Example 12

A mixed electrolyte solution was obtained by thoroughly mixing 1.0 g of the polymer solution obtained in Synthesis example 5 as curable polymer (A-3), 4.5 g of ethylene carbonate and 4.5 g of diethyl carbonate as (B), 1.0 g of LiPF$_6$ as (C) and 0.05 g of bis(2,4,6-trimethylbenzoyl)-phenylphosphine oxide (radical photoinitiator) as (D) in an argon atmosphere. This mixed solution was applied in a thickness of 30 μm on the aluminum layer of an aluminum-deposited PET film (30 μm) using a coater in an argon atmosphere and then irradiated with a high-pressure mercury lamp at 200 mJ/cm$^2$ to form a polymer solid electrolyte. Then, a propylene film (30 μm) was applied on this polymer solid electrolyte layer and further irradiated with a high-pressure mercury lamp at 300 mJ/cm$^2$, after which the top and bottom films were separated to give a polymer solid electrolyte in the form of a transparent self-supporting film having a thickness of about 30 μm. This film was measured for ionic conductivity at 25° C. and −20° C. to show 3.0 ms/cm (25° C.) and 0.3 ms/cm (−20° C.).

Example 13

A mixed electrolyte solution was obtained by thoroughly mixing 0.8 g of the polymer solution obtained in Synthesis example 6 as curable polymer (A-3), 4.6 g of ethylene carbonate and 4.6 g of diethyl carbonate as (B), 1.0 g of LiPF$_6$ as (C) and 0.05 g of bis(2,4,6-trimethylbenzoyl)-phenylphosphine oxide (radical photoinitiator) as (D) in an argon atmosphere. This mixed solution was applied in a thickness of 30 μm on the aluminum layer of an aluminum-deposited PET film (30 μm) using a coater in an argon atmosphere and then irradiated with a high-pressure mercury lamp at 200 mJ/cm$^2$ to form a polymer solid electrolyte. Then, a propylene film (30 μm) was applied on this polymer solid electrolyte layer and further irradiated with a high-pressure mercury lamp at 300 mJ/cm$^2$, after which the top and bottom films were separated to give a polymer solid electrolyte in the form of a transparent self-supporting film having a thickness of about 30 μm. This film was measured for ionic conductivity at 25° C. and −20° C. to show 3.2 ms/cm (25° C.) and 0.3 ms/cm (−20° C.).

Example 14

A mixed electrolyte solution was obtained by thoroughly mixing 0.6 g of the polymer solution obtained in Synthesis example 5 as curable polymer (A-3), 4.7 g of ethylene carbonate and 4.7 g of diethyl carbonate as (B), 1.0 g of LiPF$_6$ as (C) and 0.05 g of bis(2,4,6-trimethylbenzoyl)-phenylphosphine oxide (radical photoinitiator) as (D) in an argon atmosphere. This mixed solution was applied in a thickness of 30 μm on the aluminum layer of an aluminum-deposited PET film (30 μm) using a coater in an argon atmosphere and then irradiated with a high-pressure mercury lamp at 200 mJ/cm$^2$ to form a polymer solid electrolyte. Then, a propylene film (30 μm) was applied on this polymer solid electrolyte layer and further irradiated with a high-pressure mercury lamp at 300 mJ/cm$^2$, after which the top and bottom films were separated to give a polymer solid electrolyte in the form of a transparent self-supporting film having a thickness of about 30 μm. This film was measured for ionic conductivity at 25° C. and −20° C. to show 3.2 ms/cm (25° C.) and 0.3 ms/cm (−20° C.).

Comparative Example 1

A mixed electrolyte solution was obtained by thoroughly mixing 1.0 g of caprolactone-modified dipentaerythritol hexaacrylate (modified with 12 mol ε-caprolactone) (functionality 6, acrylate equivalent weight=325; KAYARAD DPCA-120 (manufactured by Nippon Kayaku Co., Ltd.)) in place of curable resin (A), 4.5 g of ethylene carbonate and 4.5 g of diethyl carbonate as (B), 1.0 g of $LiPF_6$ as (C) and 0.05 g of bis(2,4,6-trimethylbenzoyl)-phenylphosphine oxide (radical photoinitiator) as (D) in an argon atmosphere. This mixed solution was applied in a thickness of 30 µm on the aluminum layer of an aluminum-deposited PET film (30 µm) using a coater in an argon atmosphere and then irradiated with a high-pressure mercury lamp at 200 mJ/cm² to form a polymer solid electrolyte. Then, a propylene film (30 µm) was applied on this polymer solid electrolyte layer and further irradiated with a high-pressure mercury lamp at 300 mJ/cm², after which the top and bottom films were separated to give a polymer solid electrolyte in the form of a transparent self-supporting film having a thickness of about 30 µm. This film was measured for ionic conductivity at 25° C. and −20° C. to show 2.5 ms/cm (25° C.) and 0.2 ms/cm (−20° C.).

Comparative Example 2

A mixed electrolyte solution was obtained by thoroughly mixing 0.6 g of ethylene oxide-modified trimethylolpropane triacrylate (functionality 3, acrylate equivalent weight=142; KAYARAD THE-330 (manufactured by Nippon Kayaku Co., Ltd.)) in place of curable resin (A), 4.7 g of ethylene carbonate and 4.7 g of diethyl carbonate as (B), 1.0 g of $LiPF_6$ as (C) and 0.03 g of benzoyl peroxide (thermal polymerization initiator) as (E) in an argon atmosphere. This mixed solution was applied in a thickness of 30 µm on the aluminum layer of an aluminum-deposited PET film (30 µm) using a coater in an argon atmosphere and then heated at 80° C. for 5 hours to give a polymer solid electrolyte in the form of a transparent self-supporting film having a thickness of about 30 µm. This film was measured for ionic conductivity at 25° C. and −20° C. to show 3.0 ms/cm (25° C.) and 0.2 ms/cm (−20° C.).

Comparative Example 3

A mixed electrolyte solution was obtained by thoroughly mixing 0.3 g of ethylene oxide-modified trimethylolpropane triacrylate (functionality 3, acrylate equivalent weight=142) in place of curable resin (A), 4.85 g of ethylene carbonate and 4.85 g of diethyl carbonate as (B), 1.0 g of $LiPF_6$ as (C) and 0.03 g of benzoyl peroxide (thermal polymerization initiator) as (E) in an argon atmosphere. This mixed solution was applied in a thickness of 30 µm on the aluminum layer of an aluminum-deposited PET film (30 µm) using a coater in an argon atmosphere and then heated at 80° C. for 5 hours, but the mixed solution was not cured and any polymer solid electrode in the form of a self-supporting film could not be obtained.

It is shown from the results above that compositions are not cured at a resin concentration of 3% and require a high resin concentration for curing them and the ionic conductivity at low temperatures decreases when using curable monomers having a high functional group equivalent weight such as 325 despite the functionality of 6 as in Comparative example 1 or having a low functionality such as 3 despite the low functional group equivalent weight as in Comparative examples 2 and 3. However, it is shown that polymer solid electrolytes obtained by curing resin compositions using curable monomer (A-1) of the present invention are enough strong so that they can be separated from their support and that they have good thin film strength and high ionic conductivity, especially excellent ionic conductivity at low temperatures. It is also shown that polymer solid electrolytes using curable polymers (A-2, A-3) are enough strong so that they can be separated from their support and that they have good thin film strength and high ionic conductivity, especially excellent ionic conductivity at low temperatures even if the functional group equivalent weight is relatively high. This is attributed to the low resin concentration in the solid electrolytes.

INDUSTRIAL APPLICABILITY

Resin compositions for polymer solid electrolytes of the present invention comprising 0.5–5.0 by weight of a curable resin having a specific structure (A), a plasticizer (B) and an electrolyte (C) are excellent in thin film processability so that they are readily formed into thin films with good film strength. Polymer solid electrolytes obtained by curing the resin compositions are characterized by good film strength and high ionic conductivity.

What is claimed is:

1. A resin composition for polymer solid electrolytes comprising 0.5–5.0% by weight of a curable resin (A), a plasticizer (B) and an electrolyte (C), the curable resin (A) being a curable monomer (A-1) which is a (meth)acrylate of a reaction product obtained by reacting 1 mol of a polyhydric alcohol with 1–5 mol of caprolactone; a curable polymer (A-2) which is a polymer obtained by reacting a compound (A-2-1) having one or more hydroxyl groups in one molecule and a compound (A-2-2) having one ethylenically unsaturated double bond and one epoxy group in one molecule via the hydroxyl groups and epoxy groups wherein the ethylenically unsaturated double bond has an equivalent weight of 300 or less; or a curable polymer (A-3) which is a polymer obtained by first preparing a copolymer of a compound having both an aliphatic chain containing 6 or less carbon atoms and an ethylenically unsaturated double bond and the above compound (A-2-2) and then reacting it with a compound having one unsaturated double bond and one carboxyl group each in one molecule.

2. The resin composition for polymer solid electrolytes as defined in claim 1 wherein the curable monomer (A-1) is one or more members selected from the group consisting of caprolactone-modified tetra(meth)acrylates of pentaerythritol, caprolactone-modified tetra(meth)acrylates of ditrimethylolpropane, caprolactone-modified penta(meth)acrylates of dipentaerythritol and caprolactone-modified hexa(meth)acrylates of dipentaerythritol.

3. The resin composition for polymer solid electrolytes as defined in claim 1 wherein the ethylenically unsaturated double bond in the curable polymer (A-3) has an equivalent weight of 850 or less.

4. The resin composition for polymer solid electrolytes as defined in claim 1 further containing a photoinitiator (D).

5. The resin composition for polymer solid electrolytes as defined in claim 4 wherein the photoinitiator (D) has a maximum molar extinction coefficient of 50 or more at a wavelength of 350–450 nm.

6. The resin composition for polymer solid electrolytes as defined in claim 1 further containing a thermal polymerization initiator (E).

7. The resin composition for polymer solid electrolytes as defined in claim 6 wherein the thermal polymerization initiator (E) has a half-life of 10 hours at a temperature of 10° C. or more.

8. The resin composition for polymer solid electrolytes as defined in claim 1 wherein the electrolyte (C) is at least one member selected from the group consisting of alkali metal salts, quatemary ammonium salts, quatemary phosphonium salts and transition metal salts.

9. A polymer solid electrolyte comprising a cured product of the resin composition for polymer solid electrolytes as defined in any one of claims 1, 2, 3, 4, 5, 6, 7 or 8.

10. The polymer solid electrolyte as defined in claim 9 in the form of a sheet.

11. A polymer battery comprising the polymer solid electrolyte as defined in claim 10.

* * * * *